(12) United States Patent  (10) Patent No.: US 7,588,187 B2
Barkan et al.  (45) Date of Patent: Sep. 15, 2009

(54) NON-IMAGING LIGHT COLLECTOR FOR ELECTRO-OPTICAL SCANNER

(76) Inventors: Edward D. Barkan, 3 Enchanted Woods Ct., Miller Place, NY (US) 11764; Mark Drzymala, 42 Terry La., Commack, NY (US) 11725

( * ) Notice: Subject to any disclaimer, the term of this patent is extended or adjusted under 35 U.S.C. 154(b) by 272 days.

(21) Appl. No.: 11/704,477

(22) Filed: Feb. 9, 2007

(65) Prior Publication Data

US 2008/0191022 A1  Aug. 14, 2008

(51) Int. Cl.
*G02B 5/00* (2006.01)
*G06K 7/10* (2006.01)

(52) U.S. Cl. ............. 235/462.32; 235/454; 235/462.01; 235/462.41; 235/462.45

(58) Field of Classification Search ................. 235/454, 235/462.32, 462.41
See application file for complete search history.

(56) References Cited

U.S. PATENT DOCUMENTS

| | | | | |
|---|---|---|---|---|
| 5,357,101 | A * | 10/1994 | Plesko | 250/216 |
| 5,778,133 | A * | 7/1998 | Plesko | 385/146 |
| 6,293,468 | B1 * | 9/2001 | Rantze et al. | 235/462.25 |
| 2006/0221310 | A1 * | 10/2006 | Kim et al. | 353/99 |

FOREIGN PATENT DOCUMENTS

GB  2417094 A  2/2006

OTHER PUBLICATIONS

International Search Report and Written Opinion of International Searching Authority for International Application No. PCT/US2008/051836 (13 Pages) International Application No. PCT/US2008/051836 claims priority from the present application.

* cited by examiner

*Primary Examiner*—Michael G Lee
*Assistant Examiner*—Ali Sharifzada

(57) ABSTRACT

An extended working range electro-optical scanner (10) for reading a target bar code (100). The scanner (10) includes a scan engine (20) including a beam assembly (30) for repetitively directing a beam of light (SB2) at a scan angle ($\beta$) across the target bar code (100); an array of non-imaging light collectors (40) for collecting and concentrating reflected light from the target bar code (100), each light collector (40$a$-$h$) of the array of light collectors (40) having an entrance aperture (44) and an exit aperture (46) and wherein a total area of the entrance apertures (44) of the array of light collectors (40) is greater than 50 percent of a total area of a target-facing surface of the scan engine; and a corresponding array of photodetectors (60), each photodetector (60$a$-$h$) in the array of photodetectors (60) positioned at an exit aperture (46) of a respective light collector (40$a$-$h$) of the array of light collectors (40) to receive concentrated light from its respective light collector (40$a$-$h$) and generating an output electrical signal corresponding to an intensity of the concentrated light received by the photodetector (40$a$-$h$).

24 Claims, 4 Drawing Sheets

NON-IMAGING LIGHT COLLECTOR FOR ELECTRO-OPTICAL SCANNER

FIELD OF THE INVENTION

The present invention concerns an electro-optical scanner for reading bar codes and, more particularly, to a laser bar code reader or scanner utilizing an array of non-imaging light collectors to facilitate long-range laser scanning of bar codes.

BACKGROUND

Using a laser bar code reader or scanner for reading a bar code, that is, decoding the encoded indicia of a target bar code represented by elements of the bar code, is well known. The laser scanner generates a beam of light, typically a laser beam, which is repeatedly scanned across a target bar code. The elements or features of a bar code, e.g., black bars and white spaces of a UPC bar code, absorb and diffusely reflect the laser beam light. Reflected light from the bar code is collected and focused on one or more photodetectors of the laser scanner. Output signals from the one or more photodetectors are appropriately processed and then input to decoding circuitry of the scanner and decoded.

To collect and direct reflected light onto a photodetector, optical focusing lenses have been employed in laser scanners. Optical focusing lenses however generally require larger photodetectors and, thus, such systems may be more costly. Alternately, non-imaging light collectors have been utilized in laser scanners to facilitate reading of bar codes. For example, U.S. Pat. No. 5,357,101 to Plesko discloses a non-imaging light collector used to collect and concentrate light on a photodetector of a laser scanner. The Plesko '101 patent is incorporated herein in its entirety by reference.

Non-imaging light collectors have an advantage over conventional lenses for non retro-reflective light collection systems in laser scanners because they can provide a wide field of view while concentrating collected light onto a small photodetector region. Wide fields of view can be accommodated by conventional lens systems, but the required size of the photodetector is increased. Smaller photodetectors are advantageous in that they exhibit lower capacitance and minimize noise thereby increasing the signal-to-noise ratio.

In the past, laser scanners utilizing non-imaging light collectors have been limited to working at relatively short ranges, typically, limited to no more than around 20 inches from the scanning head to the target bar code. Scanners with this type of short range typically require relatively wide scan angles of around 50 degrees to successfully read bar codes, thus, non-imaging light collectors provide a good solution for short working range laser scanners with wide scan angles. However, some scanning applications require longer working range, up to several feet. These longer range scanners operate at much narrower scan angles, typically 10 to 15 degrees. However, the greater the distance between the scanner and the target bar code, the more difficult it is to obtain sufficient reflected light from the target bar code such that the photodetector output signal can be successfully decoded. Moreover, the greater the distance between the scanner and the target bar code, more sources of ambient light, which constitutes noise to the scanner decoding process, have to be dealt with. Thus, longer range scanners require collection of as much reflected laser light from the target bar code as possible while minimizing ambient light received by the photodetector.

What is needed is a light collection system for a laser scanner that provides for extended working range laser scanning while minimizing required photodetector size.

SUMMARY

The present disclosure concerns an extended range electro-optical scanner for reading bar codes. The scan engine includes a beam assembly for repetitively directing a beam of light at a scan angle across a target bar code; an array of non-imaging light collectors for collecting and concentrating reflected light from the target bar code, each light collector of the array of light collectors having an entrance aperture and an exit aperture wherein a total area of the entrance apertures of the array of light collectors is greater than 50 percent of a total area of a target-facing surface of the scan engine; and a corresponding array of photodetectors, each photodetector in the array of photodetectors positioned at the exit aperture of a respective light collector of the array of light collectors to receive concentrated light from its respective light collector and generating an output electrical signal corresponding to an intensity of the concentrated light received by the photodetector.

In one the exemplary embodiment, the array of non-imaging light collectors is a two dimensional array of parallel light collectors facing toward the target and a collection angle of each light collector substantially matches the scan angle of the beam assembly.

In another aspect, the present invention concerns a scanning module for an electro-optical scanner for reading a target bar code. The scanning module features a beam assembly for repetitively directing a beam of light at a scan angle across the target bar code; an array of non-imaging light collectors for collecting and concentrating reflected light from the target bar code, each light collector of the array of light collectors having an entrance aperture and an exit aperture wherein a total area of the entrance apertures of the array of light collectors is greater than 50 percent of a total area of a target-facing surface of the scan engine and wherein a total area of the entrance apertures is greater than 50 percent of a total area of a target-facing surface of the scan engine; and a corresponding array of photodetectors, each photodetector in the array of photodetectors positioned at an exit aperture of a respective light collector of the array of light collectors to receive concentrated light from its respective light collector and generating an output electrical signal corresponding to an intensity of the concentrated light received by the photodetector.

These and other objects, advantages, and features of exemplary embodiments are described in detail in conjunction with the accompanying drawings.

BRIEF DESCRIPTION OF THE DRAWINGS

The foregoing and other features and advantages of the present invention will become apparent to one skilled in the art to which the present invention relates upon consideration of the following description of the invention with reference to the accompanying drawings, in which.

DETAILED DESCRIPTION

Figure 1:
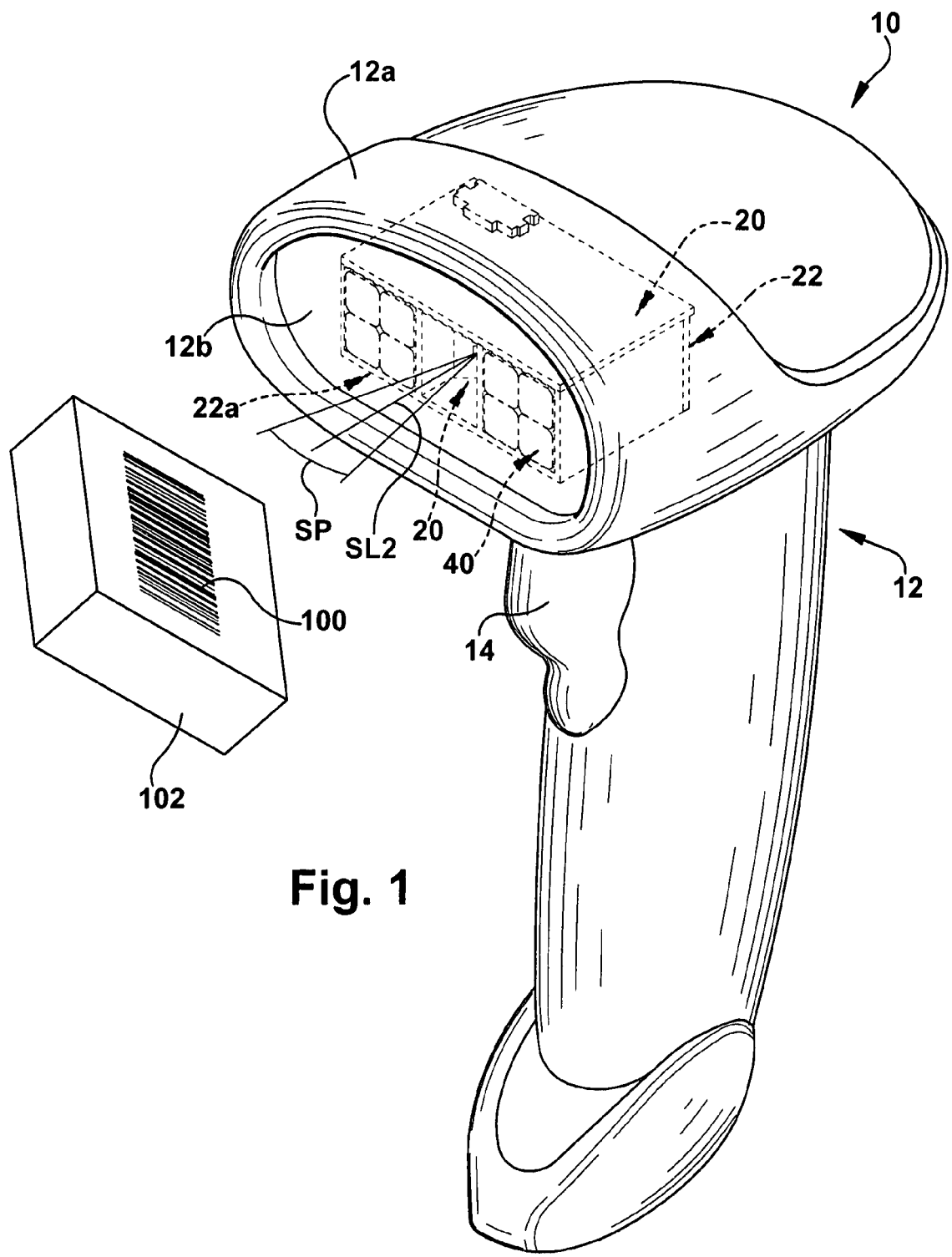
FIG. 1 is a schematic perspective view of an exemplary embodiment of an electro-optical scanner of the present invention including a scan engine having an array of non-imaging light collectors.
Figure 2:
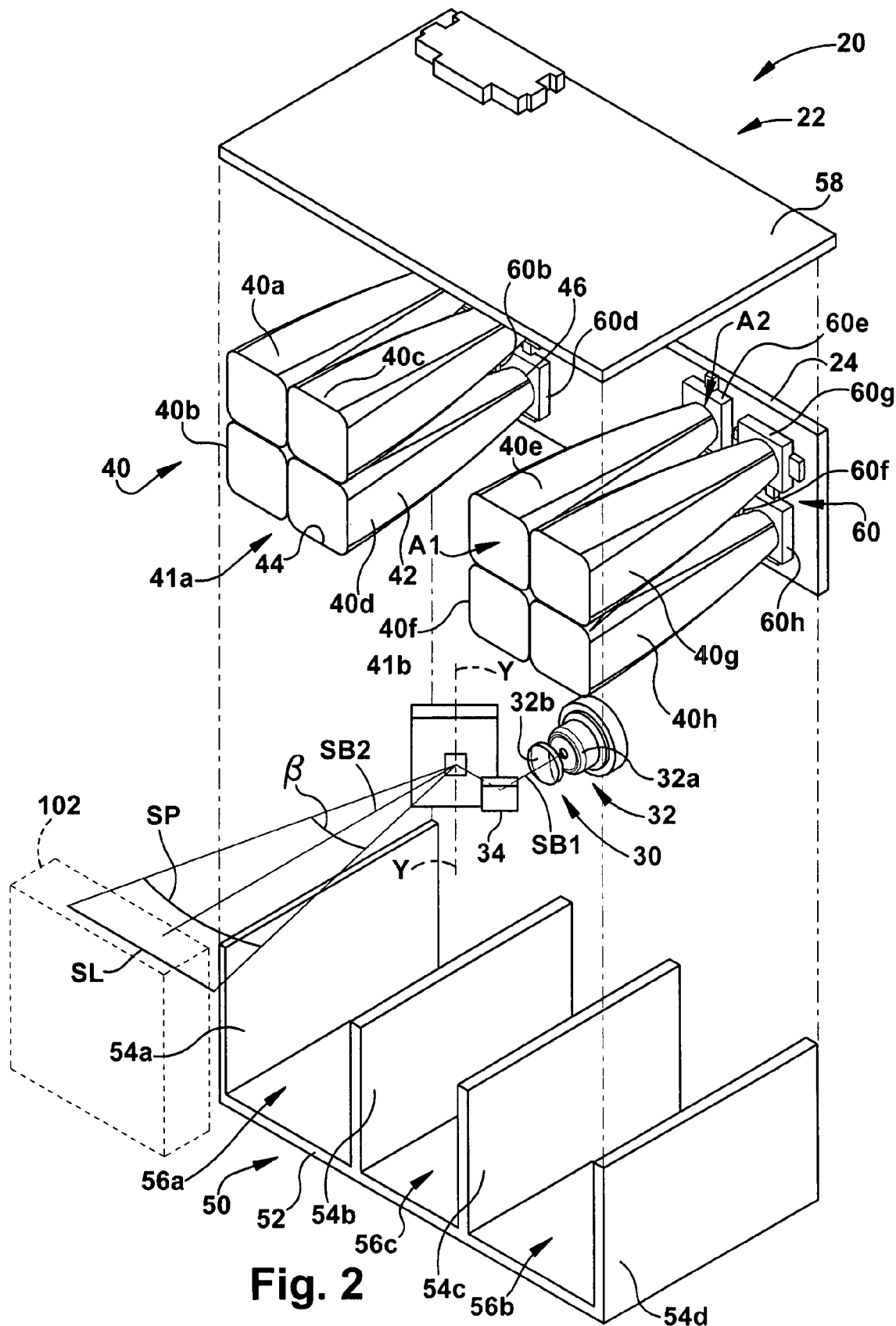
FIG. 2 is a schematic exploded perspective view of the scan engine of FIG. 1.
Figure 3:
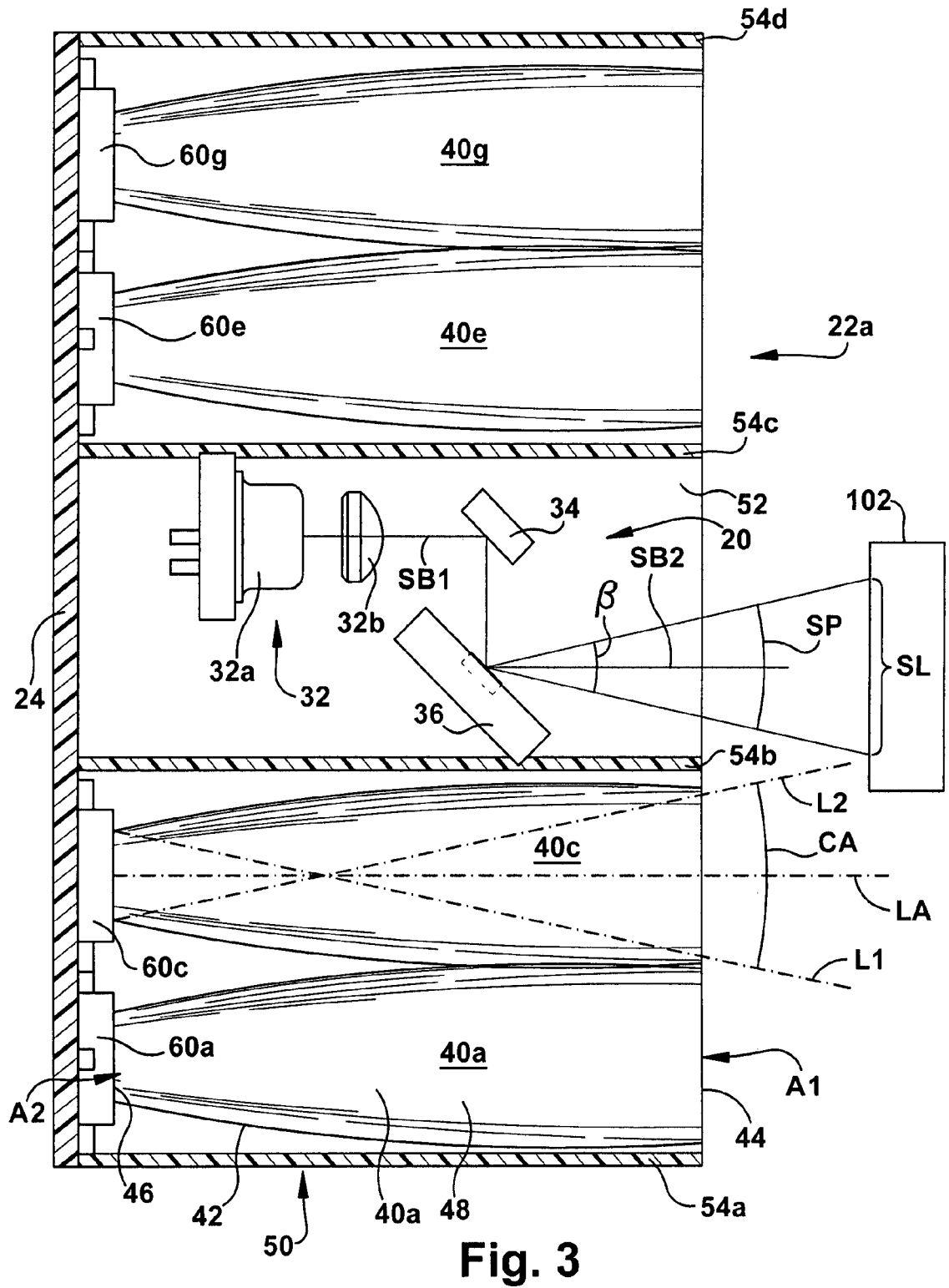
FIG. 3 is a schematic top sectional view of the scan engine of FIG. 1.
Figure 4:
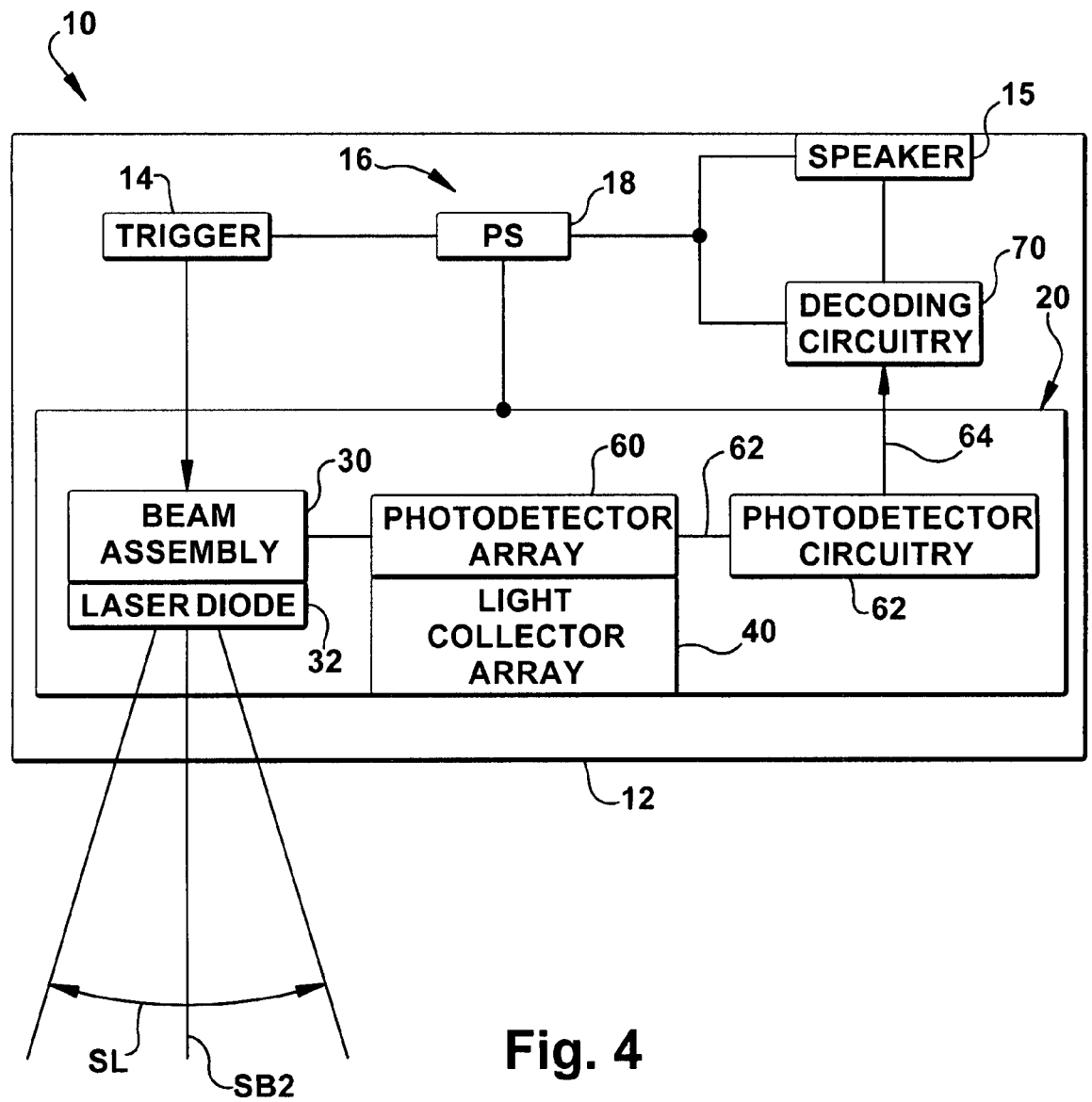
FIG. 4 is a schematic block diagram of selected circuitry of the bar code scanner of FIG. 1.

An exemplary embodiment of an electro-optical scanner of the present invention is shown schematically at 10 in FIGS. 1-3. The scanner 10 may be used to scan and decode bar codes, such as, 1D and 2D bar codes and postal codes. As used herein, the term "bar code" is intended to be broadly construed to cover not only bar code symbol patterns comprised of alternating bars and spaces, but also other graphic patterns, such as dot or matrix array patterns and, more generally, indicia having portions of different light reflectivity or surface characteristics that result in contrasting detected signal characteristics that can be used for encoding information and can be scanned and decoded with the scanner 10. FIGS. 1 and 3 depict a target 1D bar code 100 affixed to a product 102.

In one preferred embodiment of the present invention, the scanner 10 is a hand held, portable bar code reader. The scanner 10 is supported in a pistol-shaped housing 12 that can be carried and used by a user walking or riding through a store, warehouse or plant for reading bar codes for stocking and inventory control purposes. However, it should be recognized that scanner 10 of the present invention may be embodied in a stationary scanner. It is the intent of the present invention to encompass all such scanners.

The scanner 10 includes an actuation trigger 14 and a speaker 15 providing an audio output to a user of the scanner 10 upon successful reading, that is, scanning and decoding of the target bar code 100. Also provided are data communications ports (not shown) and/or an rf transceiver (not shown) for uploading and downloading information to a remote computer system. The actuation trigger 14 and other input/output components are coupled to the scanner circuitry 16 supported in the housing 12. The housing 12 also supports a power supply 18 which supplies regulated DC power to the scanner circuitry 16.

The scanner circuitry 16, which operates under the control of one or more microprocessors, includes a non retro-reflective scanning module or scan engine 20. The scanning module 20 is supported within a housing 22. The scanning module housing 22 is, in turn supported, within a front or forward facing portion 12*a* (FIG. 1) of the scanner housing 12. A forward facing side 22*a* of the scanning module housing 22 (this is, the side of the housing facing the target bar code 100) is positioned adjacent to and behind a protective transparent window 12*b*. The scanning module 20 includes a beam assembly 30 for producing a scanning light beam SB1 (FIG. 3), an array of non-imaging light collectors 40 for receiving and concentrating reflected light from the target bar code 100, and an array of photodetectors 60 corresponding on a one-to-one basis to the light collectors 40*a*, 40*b*, 40*c*, 40*d*, 40*e*, 40*f*, 40*g*, 40*h* of the array of light collectors 40.

Preferably, the array of photodetectors 60 comprises a plurality of photodiodes 60*a*, 60*b*, 60*c*, 60*d*, 60*e*, 60*f*, 60*g*, 60*h*, whose light receiving surfaces are aligned with and substantially congruent with respective exit apertures of the light collectors 40*a-h*. The photodiodes 60*a-h* receive light reflected from the target bar code 100 and convert the reflected light to an analog signal representative of the pattern of dark bars and light spaces of the bar code 100. The analog signals output by the photodiodes 60*a-h* are input to photodetector circuitry where the signals are appropriately sampled, selected and /or combined to generate a robust output signal with a good signal to noise ratio. The output signal is then digitized. The digitized output signal is subsequently decoded by decoding circuitry 70, which are part of the scanner circuitry 16. Because each photodetector 60*a-h* generates an analog signal, the photodetector circuitry can select, sample and combine the signals to generate an output signal that is superior in quality to any one signal generated by any one of the photodetectors.

The beam assembly 30 of the scanning module 20 produces a light beam such as a laser beam that is scanned repetitively to generate a scan line SL. The beam assembly 30 includes a laser diode assembly 32, a fold mirror 34 and an oscillating mirror 36. The laser diode assembly 32 includes a laser diode 32*a* and focusing optics 32*b*. The laser diode assembly 32 generates a laser light beam SB1 that is directed to intersect the fold mirror 34 which, in turn, directs the beam SB1 at the oscillating mirror 36. The oscillating mirror 36 is oscillated by a drive mechanism (not shown) about a vertical axis Y-Y through an arc or scanning rotation angle. The beam line SB1 is reflected, redirected and scanned in a horizontal direction by the oscillating mirror 36. The redirected scanning beam line SB2 exits the scan module 20 and intersects the target bar code 100. As can be seen in FIG. 3, the oscillation of the mirror 36 generates a scan angle $\beta$, that is, the scanning angle encompassed by the reciprocating beam line SB2 is the scan angle $\beta$. Since the beam line SB2 is being scanned horizontally at scan angle $\beta$, the beam forms the horizontal scan line SL (FIG. 2) which extends across the bar code 100. Thus, as is shown schematically in dashed line in FIG. 2, a pie shaped scanning plane SP is formed emanating from the oscillating mirror 36. For extended range scanning, a typical scan angle would be on the order of 10-12 degrees. Light from the scan line SL reflects off of the target bar code 100 and is received by the light collectors 40*a-h* and focused onto the photodetectors 60*a-h*. The analog electric signals generated by the photodetectors 60*a-h* are operated on by the photodetector circuitry to generate a digitized signal and decoded by decoding circuitry 70.

Light Collector Array 40 & Photodetector Array 60

Advantageously, the light collector array 40 and photodetector array 60 of the present invention provide for extended working range of the scanner 10 and also provide for a small size or footprint of the scan engine 20. Typically, the scan engine 20 has a front to back dimension of around 1.5 inches or less. The light collector array 40 and the photodetectors array 60 are configured within the scan engine housing 22 in an aligned two dimensional array. To provide for a balanced collection of laser light reflected from the target bar code 100, a first group or set 41*a* of four light collectors is positioned horizontally on one side of the beam assembly 30 and a second group or set 41*b* of light collectors is positioned on an opposite of the beam assembly 30.

Supporting and positioning the light collectors 40*a-h* of the light collector array 40 is a support baffle 50. The support baffle 50 includes a base 52 that defines a bottom or floor portion of the scan engine housing 22. The support baffle further includes four vertical walls 54*a*, 54*b*, 54*c*, 54*d*. The first set of four light collectors 41*a* are positioned within an area 56*a* defined by outer and interior vertical side walls 54*a*, 54*b* and base 52, while the second set of four light collectors 41*b* are positioned within an area 56*b* defined by interior and outer side walls 54*c*, 54*d* and base 52. The beam assembly 30 is positioned within an area 56*c* defined by interior side walls 54*b*, 54*c*. Advantageously, the side walls 54*b*, 54*c* prevent light from the beam assembly 30 which is to be directed outwardly toward the target bar code 100 from encroaching on the entrance apertures 44 of any of the light collectors 40*a-h*. The base 52 and walls 54*a-d* may be an integral unit or the wall and base may be separate components affixed together.

The scan engine housing 22 prevents ambient illumination from impinging upon the photodetector array 60. The housing 22 includes a planar top 58 which seals against the outer walls 54*a*, 54*d* and an upper edge of the 24*a* of the PC board 24. The housing 22 may include additional outer panels (not shown) for light shielding purposes.

Each light collector 40*a-h* includes a body 42 defining a substantially rectangular or square input or entrance aperture 44 and an exit aperture 46 that conforms to the shape of the light receiving surface of the corresponding photodiode 60*a-h*. The square input apertures 44 maximize the reflected light collected from the target bar code 100 and, together with the scan engine housing 22, shield the photodetector array 60 from ambient illumination. The exit aperture 46 of its light collector 40*a-h* abuts and overlies a light receiving surface 62 of its respective aligned photoelectric converter or photodiode 60*a-h*. The exit aperture 46 substantially circular and conforms to the size and the shape of the light receiving surface of the photodiode 62. An interior surface 48*a* of the body 48 of each light collector comprises a non-imaging cone concentrator coated with a highly reflective surface such as aluminum and is parabolic in shape as seen in FIG. 3. Alternately, the interior surface 48*a* may be a highly polished optical quality surface which relies on total internal reflection to reflect and direct the collected light. Optical filters (not shown) may be positioned over the input apertures 44 to filter out unwanted wavelengths of light and allow wavelengths in a desired range or ranges to pass through the filter and travel into the interior of the collectors 40*a-h*.

To increase the effective working range of the scanner 10, the light collector body 48 is configured such that a collection angle CA (shown in FIG. 3 for collector 40*c*) of the collector is narrow. In one embodiment, the collectors 40*a-h* are configured such that the collection angle CA when viewed in the horizontal direction (that is, viewed along the scan plane SP) substantially matches the scan angle β of the beam assembly 30. Generally, for extended range scanning, the collection angle will be 25° or less when viewed across the horizontal plane through the body 48. This provides for increased working range of the scanner 10. In the vertical plane, that is perpendicular to the scan plane SP, the collection angle (not shown) may be much narrower than in the horizontal plane because light reflected from the scan line SL hitting the target bar code 100 is all that is desired to be collected. Advantageously, by use of multiple collectors 40*a-h*, each having a relatively small collection angle CA, the capability of the scan engine 20 to collect and concentrate reflected light from the target bar code 100 is enhanced thereby increasing the effective working range of the scanner 10.

By way of example, assume that a total area of the entrance apertures 44 of the array of collectors 40 is some value TA. If, instead of the array of collectors 40, a single light collector was used with an entrance aperture having an area of TA and assuming that the photodetector area and, therefore, the exit aperture is the same size as with the collectors 40*a-h*, it is clear that the collection angle of the single light collector would be very much larger than the aggregate collection angle or field of view of the array of collectors 40. Accordingly, the array of collectors 40 of the present invention (having a total entrance area TA) can be thought of as providing a relatively small field of view or aggregate collection angle, in comparison with the field of view or collection angle of a single collector which has the same total entrance area TA. Thus, the long range scanning performance of the scanner 10 is significantly improved because long range scanners are characterized by having relatively small scan angles and the array of collectors 40 of the present invention, taken as a group, provides a similarly small or matching field of view or collection angle.

As seen in FIG. 3 the collectors 40*a-h* are parallel and for a given collector, say collector 40*c*, the collection angle CA is the angle included between straight lines L1, L2 drawn between an edge of the entrance and exit apertures 44, 46 on one side of the collector and an edge of the entrance and exit apertures 44, 46 on an opposite side of the collector. Stated another way, if the collection angle is 25°, half of the collection angle CA (approximately 12.5° degrees) may be found by looking at the angle between L1 (or L2) and a longitudinal axis LA through the light collector body 48. Light rays that enter the input aperture 44 at an angle that is within the collection angle, that is, enter the input aperture 44 at an angle less than or equal to the collection angle CA, are internally reflected and concentrated at the exit aperture 46 such that the concentrated light rays emerge from the exit aperture and impinge upon the photodiode 62. Light rays that enter the input aperture 44 but are at an angle greater than the collection angle CA will be turned back and will not emerge from the exit aperture. This narrow collection angle CA has the effect of collecting and concentrating reflected light from the target bar code 100 while rejecting undesired ambient light, such as overhead light, sunlight, etc. which is not within the collection angle.

The light concentration ratio for the light collectors 40*a-h* may be expressed as a ratio of an area A1 of the entrance or input aperture 44 divided by an area A2 of the exit aperture. The values of two areas A1, A2 are dependent on the construction of the light collector and the desired degree of concentration.

Advantageously, when looking at the front or forward facing side 22*a* of the scan engine housing 22, the tight packing of the light collectors 40*a-h* within the baffle 50 and the rectangular or square-shaped input apertures 44 insure a ratio of the total area TA of the input apertures 44 of the light collector array 40 (that is, the sum of the areas A1 for all light collectors 40*a-h*) to the total area of the front surface or side 22*a* is in excess of 50%. The narrow collection angle CA of the light collectors 40*a-h*, the light concentration effect of the light collectors, and use of a closely packed array of light collectors 40*a-h* all contribute to an increased effective working range of the scanner 10. Moreover, the fact that the light collectors 40*a-h* are non-imaging light collectors versus imaging-type light collectors results in a lower cost of fabricating the light collector array 40.

While the present invention has been described with a degree of particularity, it is the intent that the invention includes all modifications and alterations from the disclosed design falling with the spirit or scope of the appended claims.

We claim:

1. A scan engine comprising:
    a beam assembly for repetitively directing a beam of light along a path of travel at a scan angle toward the target bar code;
    an array of non-imaging light collectors for collecting and concentrating reflected light from the target bar code, each light collector of the array of light collectors having an entrance aperture and an exit aperture and wherein a collection angle of the collector is less than or equal to scan angle of the beam assembly and a total area of the entrance apertures of the array of light collectors is greater than 50 percent of a total area of a target-facing surface of the scan engine, the array of light collectors being laterally offset from the beam assembly such that the light beam does not pass through any of the light collectors of the array of light collectors along its path of travel toward the target bar code; and a corresponding array of photodetectors, each photodetector in the array of photodetectors positioned adjacent the exit aperture of a respective light collector of the array of light collectors to receive concentrated light from its respective light collector and generate an output electrical signal corresponding to an intensity of the concentrated light received by the photodetector.

2. The scan engine of claim 1 wherein the array of non-imaging light collectors is a two dimensional array of parallel light collectors.

3. The scan engine of claim 1 wherein for each light collector of the array of collectors, a longitudinal axis through the collector is substantially parallel to a center of the beam assembly light beam.

4. The scan engine of claim 1 wherein for each light collector of the array of collectors, a collection angle of the collectors is less than or equal to 25 degrees.

5. The scan engine of claim 1 wherein the light beam of the beam assembly is a laser beam.

6. The scan engine of claim 1 wherein each photodetector of the array of photodetectors is a photodiode.

7. The scan engine of claim 6 wherein the beam assembly is centered within the array of light collectors, with a first plurality of light collectors of the array of light collectors positioned on one side of the laser diode assembly and a second plurality of light collectors positioned on an opposite side of the laser diode assembly.

8. The scan engine of claim 7 wherein the first plurality of light collectors includes substantially one half of the light collectors of the array of light collectors and the second plurality of light collectors includes substantially one half of the light collectors of the array of light collectors.

9. The scan engine of claim 1 wherein the light collectors of the array of light collectors are supported within a support baffle having a pair of walls extending between the array of light collectors and the beam assembly.

10. The scan engine of claim 9 wherein the support baffle comprises a base portion of a housing of the scan engine.

11. A scanning module for an electro-optical scanner for reading a target bar code, the scanning module comprising:

beam assembly for repetitively directing a beam of light along a path of travel at a scan angle toward the target bar code;

an array of non-imaging light collectors for collecting and concentrating reflected light from the target bar code, each light collector of the array of light collectors having an entrance aperture and an exit aperture with a collection angle of less than or equal to the scan angle and wherein a total area of the entrance apertures of the array of light collectors is greater than 50 percent of a total area of a target-facing surface of the scanning module, the array of light collectors being laterally offset from the beam assembly such that the light beam does not pass through any of the light collectors of the array of light collectors along its path of travel toward the target bar code; and a corresponding array of photodetectors, each photodetector in the array of photodetectors positioned at the exit aperture of a respective light collector of the array of light collectors to receive concentrated light from its respective light collector and generate an output electrical signal corresponding to an intensity of the concentrated light received by the photodetector.

12. The scanning module of claim 11 wherein the array of non-imaging light collectors is a two dimensional array.

13. The scanning module of claim 11 wherein for each light collector of the array of collectors, a longitudinal axis through the collector is substantially parallel to a center of the beam assembly light beam.

14. The scanning module of claim 11 wherein for each light collector of the array of collectors, a collection angle of the collectors is less than or equal to 25 degrees.

15. The scanning module of claim 11 wherein the light beam of the beam assembly is a laser beam.

16. The scanning module of claim 11 wherein each photodetector of the array of photodetectors is a photodiode.

17. The scanning module of claim 16 wherein the beam assembly is centered within the array of light collectors, with a first plurality of light collectors of the array of light collectors positioned on one side of the beam assembly and a second plurality of light collectors positioned on an opposite side of the beam assembly.

18. The scanning module of claim 17 wherein the first plurality of light collectors includes substantially one half of the light collectors of the array of light collectors and the second plurality of light collectors includes substantially one half of the light collectors of the array of light collectors.

19. The scanning module of claim 11 wherein the light collectors of the array of light collectors are supported within a support baffle having a pair of walls extending between the array of light collectors and the laser diode assembly.

20. The scanning module of claim 19 wherein the support baffle comprises a base portion of a housing of the scanning module.

21. A scan engine comprising:

beam generating means for repetitively directing a beam of light along a path of travel at a scan angle toward the target bar code;

non-imaging light collector array means for collecting and concentrating reflected light from the target bar code, each light collector of the light collector array means having an entrance aperture and an exit aperture and wherein a collection angle of the collector is less than or equal to the scan angle of the beam assembly means and a total area of the entrance apertures of the light collector array means is greater than 50 percent of a total area of a target-facing surface of the scan engine, the light collector array means being laterally offset from the beam generating means such that the light beam does not pass through any of the light collectors of the light collector array means along its path of travel toward the target bar code; and photodetector array means positioned at an exit aperture of a respective light collector of the array of light collectors for receiving concentrated light from its respective light collector and generating an output electrical signal corresponding to an intensity of the concentrated light received by the photodetector.

22. A method of scanning a target bar code, the steps of the method comprising:

providing a scan engine including: a beam assembly for repetitively directing a beam of light along a path of travel at a scan angle toward the target bar code;

a non-imaging light collector array for collecting and concentrating reflected light from the target bar code, wherein each light collector of the array of light collectors has an entrance aperture and an exit aperture and wherein a collection angle of the collector is less than or equal to scan angle of the beam assembly and a total area of the entrance apertures of the array of light collectors is greater than 50 percent of a total area of a target-facing surface of the scan engine, the array of light collectors being laterally offset from the beam assembly such that the light beam does not pass through any of the light collectors of the array of light collectors along its path of travel toward the target bar code; and a photodetector array positioned at an exit aperture of a respective light collector of the array of light collectors for receiving concentrated light from its respective light collector and generating an output electrical signal corresponding to an intensity of the concentrated light received by the photodetector engine; and scanning the target bar code by actuating the scan engine.

23. A scan engine comprising:

a beam assembly for repetitively directing a beam of light along a path of travel at a scan angle toward the target bar code;

an array of non-imaging light collectors for collecting and concentrating reflected light from the target bar code, each light collector of the array of light collectors having an entrance aperture and an exit aperture with a collection angle that is substantially equally to the scan angle, the array of light collectors being laterally offset from the beam assembly such that the light beam does not pass through any of the light collectors of the array of light collectors along its path of travel toward the target bar code; and a corresponding array of photodetectors, each photodetector in the array of photodetectors positioned adjacent the exit aperture of a respective light collector of the array of light collectors to receive concentrated light from its respective light collector and generate an output electrical signal corresponding to an intensity of the concentrated light received by the photodetector.

24. An electro-optical scanner comprising:

a housing supporting a trigger for actuating the scanner;

a scan engine supported within the housing, the scan engine including:

a beam assembly for repetitively directing a beam of light along a path of travel at a scan angle toward the target bar code;

an array of non-imaging light collectors for collecting and concentrating reflected light from the target bar code, each light collector of the array of light collectors having an entrance aperture and an exit aperture and wherein a collection angle of the collector is less than or equal to scan angle of the beam assembly and a total area of the entrance apertures of the array of light collectors is greater than 50 percent of a total area of a target-facing surface of the scan engine, the array of light collectors being laterally offset from the beam assembly such that the light beam does not pass through any of the light collectors of the array of light collectors along its path of travel toward the target bar code; and a corresponding array of photodetectors, each photodetector in the array of photodetectors positioned adjacent the exit aperture of a respective light collector of the array of light collectors to receive concentrated light from its respective light collector and generate an output electrical signal corresponding to an intensity of the concentrated light received by the photodetector.

* * * * *